(12) United States Patent
Rainville

(10) Patent No.: US 7,396,604 B2
(45) Date of Patent: Jul. 8, 2008

(54) CENTRIFUGAL COMPRESSOR SURGE DETECTION USING A BI-DIRECTIONAL MFM IN A FUEL CELL SYSTEM

(75) Inventor: Joseph D. Rainville, Caledonia, NY (US)

(73) Assignee: General Motors Corporation, Detroit, MI (US)

( * ) Notice: Subject to any disclaimer, the term of this patent is extended or adjusted under 35 U.S.C. 154(b) by 791 days.

(21) Appl. No.: 10/696,279

(22) Filed: Oct. 29, 2003

(65) Prior Publication Data
US 2005/0095474 A1 May 5, 2005

(51) Int. Cl.
H01M 8/04 (2006.01)
H01M 8/00 (2006.01)
H01M 8/12 (2006.01)

(52) U.S. Cl. .............................. 429/22; 429/13; 429/25
(58) Field of Classification Search .................. None
See application file for complete search history.

(56) References Cited

U.S. PATENT DOCUMENTS 6,984,464 B2 * 1/2006 Margiott et al. ................ 429/12

OTHER PUBLICATIONS

Article entitled "Surge Control," available Jan. 10, 2002, [online], [retrieved on Apr. 10, 2006] Retrieved from the Dresser-Rand website <URL:http:llwww.dresser-rand.comlcontrolslscO498,htm>.*

* cited by examiner

Primary Examiner—Jonathan Crepeau
Assistant Examiner—Robert Hodge

(57) ABSTRACT

A fuel cell system including a turbomachine compressor that delivers charge air to the cathode side of a fuel cell module. A bi-directional mass flow meter measures the airflow through the compressor, and provides an indication of a reverse airflow through the compressor for surge protection. A controller receives a signal from the mass flow meter indicative of the reverse flow. The controller controls a motor driving the compressor and a back pressure valve at the cathode exhaust of the fuel cell module to control the pressure in the fuel cell module to remove the surge condition.

14 Claims, 1 Drawing Sheet

CENTRIFUGAL COMPRESSOR SURGE DETECTION USING A BI-DIRECTIONAL MFM IN A FUEL CELL SYSTEM

BACKGROUND OF THE INVENTION

1. Field of the Invention

This invention relates generally to an air delivery sub-system for a fuel cell system and, more particularly, to an air delivery sub-system for a fuel cell system, where the air delivery sub-system includes a bi-directional mass flow meter (MFM) that measures airflow to and from a turbomachine type compressor in the sub-system to detect compressor surges.

2. Discussion of the Related Art

Hydrogen is a very attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A hydrogen fuel cell is an electrochemical device that includes an anode and a cathode with an electrolyte therebetween. The anode receives hydrogen gas and the cathode receives oxygen or air. The hydrogen gas is disassociated in the anode to generate free hydrogen protons and electrons. The hydrogen protons pass through the electrolyte to the cathode. The hydrogen protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are a popular fuel cell for vehicles. The PEMFC generally includes a solid polymer electrolyte proton conducting membrane, such as a perflurosulfonic acid membrane. The anode and cathode typically include finely divided catalytic particles, usually platinum (Pt), supported on carbon particles and mixed with an ionomer. The combination of the anode, cathode and membrane define a membrane electrode assembly (MEA). MEAs are relatively expensive to manufacture and require certain conditions for effective operation. These conditions include proper water management and humidification, and control of catalyst poisoning constituents, such as carbon monoxide (CO).

Many fuel cells are typically combined in a fuel cell stack to generate the desired power. The fuel cell stack receives a cathode charge gas that includes oxygen, and is typically a flow of forced air from a compressor. Not all of the oxygen in the air is consumed by the stack and some of the air is output as a cathode exhaust gas that may include water as a stack by-product.

FIG. 1 is a plan view of a fuel cell system 10 including an air delivery sub-system 12 and a fuel cell module (FCM) 14 having a fuel cell stack of the type discussed above. The sub-system 12 includes a turbomachine compressor 16 that provides charge air to the cathode side of the FCM 14. The compressor 16 can be any suitable turbomachine type compressor, such as a centrifugal, radial, axial, mixed flow, etc., compressor. This type of compressor is desirable in the system 10 because it is low cost and low weight, and operates with low noise as compared to the positive displacement compressors, such as twin-screw compressors, that are currently employed in fuel cell systems. The hydrogen fuel input to the FCM 14 is not shown in this diagram. Cathode exhaust, including unused air and water, is emitted from the FCM 14 through a cathode exhaust line 26. A back pressure valve 24 in the cathode exhaust line 26 is opened and closed to control the pressure within the FCM 14, and thus, control stack pressure, membrane humidity, etc.

A motor 18 drives the compressor 16 at the appropriate speed to provide the desired amount of charge air to the FCM 14 for the desired output power. Air from the environment is filtered by a filter/attenuator 20 that also reduces compressor whine. The filtered air is sent through a mass flow meter (MFM) 22 that measures the airflow through the compressor 16. A signal indicative of the airflow through the compressor 16 from the MFM 22 is sent to a controller 28. The controller 28 controls the speed of the motor 18 to control the airflow through the compressor 16 to provide the proper air stoichiometry or lambda. The controller 28 also controls the orientation of the back pressure valve 24 to control the pressure within the FCM 14, and thus, membrane humidity. Many factors determine the speed of the compressor 16, including desired output power, ambient temperature, altitude, etc.

It is necessary that the compressor 16 operate on its map of pressure ratio (outlet pressure/inlet pressure) versus air flow. This map of pressure ratio is bound by a surge line at which the compressor 16 suffers from an audible flow reversion caused by excessive backpressure as a result of the stack pressure within the FCM 14. This backpressure is generally caused by the back pressure valve 24. In other words, the pressure within the FCM 14 sometimes causes a reverse flow of air through the compressor 16 that is determined by the drive power from the motor 18, the altitude and the temperature. The map of the pressure ratio is also bound by a choke line where the maximum airflow is reached with minimal pressure for a given compressor speed.

The compressor 16 cannot operate at pressure ratios that put the compressor 16 into a surge condition because of severe oscillation of the airflow through the compressor 16 that could damage the compressor 16. Therefore, the system 10 requires a surge protector that identifies a reverse airflow through the compressor 16 to prevent compressor surge. A reverse airflow through the known positive displacement compressors did not present a problem or cause compressor damage, and thus, surge detection is typically not required on known fuel cell systems.

SUMMARY OF THE INVENTION

In accordance with the teachings of the present invention, a fuel cell system is disclosed that includes a centrifugal compressor that delivers charge air to the cathode side of a fuel cell module. A bi-directional mass flow meter measures the airflow to the compressor, and provides an indication of a reverse airflow through the compressor for surge protection purposes. A controller receives a signal from the mass flow meter indicative of the direction of the charge airflow, and thus, an indication of whether the compressor is under surge. The controller controls a motor that drives the compressor and controls a back pressure valve at the cathode exhaust of the fuel cell module to control the pressure in the fuel cell module to remove the surge condition if detected.

Additional advantages and features of the present invention will become apparent from the following description and appended claims, taken in conjunction with the accompanying drawings.

DETAILED DESCRIPTION OF THE INVENTION

The following description of the embodiments of the invention directed to a fuel cell system including a bi-directional mass flow meter that provides compressor surge detection is merely exemplary in nature, and is in no way intended to limit the invention or its applications or uses.

Figure 1:
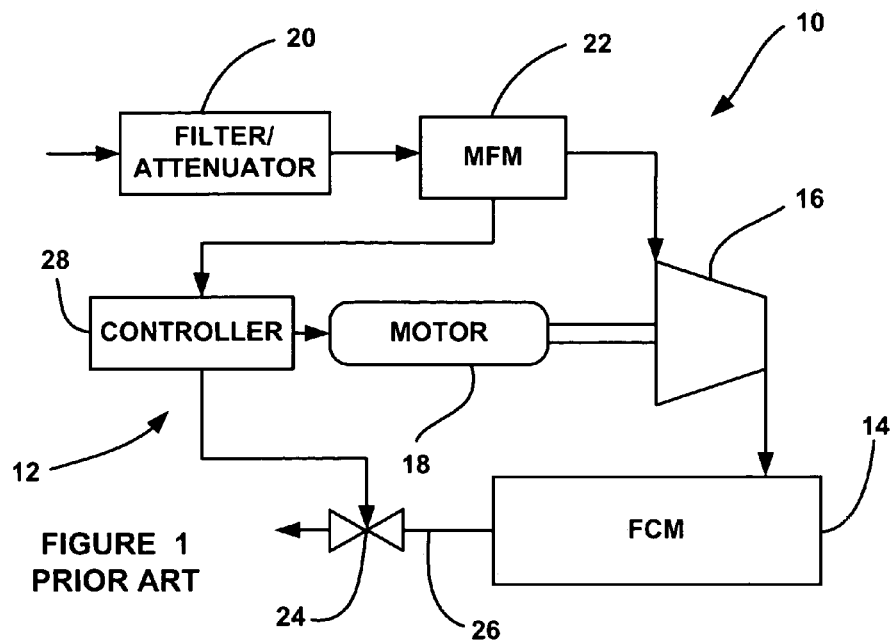
FIG. 1 is a plan view of a known fuel cell system including an air delivery sub-system.
Figure 2:
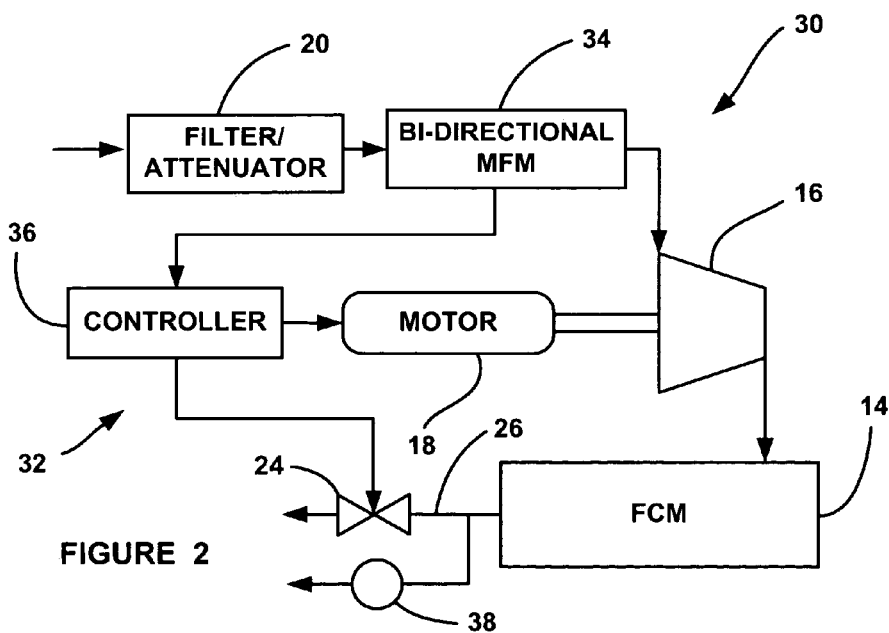
FIG. 2 is a plan view of a fuel cell system including an air delivery sub-system having a bi-directional mass flow meter for measuring reverse airflow through a centrifugal compressor to prevent compressor surges, according to an embodiment of the present invention.

FIG. 2 is a plan view of a fuel cell system 30 including an air delivery sub-system 32, according to an embodiment of the present invention. The system 30 is similar to the system 10 discussed above, where like reference numerals identify like elements. In this design, the air delivery sub-system 32 includes a bi-directional MFM 34 that measures airflow through the centrifugal compressor 16 in both directions. Because the MFM 34 is capable of detecting airflow in both directions, it acts as a surge protection device to detect back-pressure to the compressor 16 from the FCM 14. In one embodiment, the MFM 34 is a known bi-directional MFM sometimes used in small four cylinder gas engines to measure the reverse pulse generated by the engine to accurately measure the incoming airflow by subtracting out the reverse pulse or flow reversal. However, other types of bi-directional flow meters that are suitable for the purposes discussed herein can be used for the MFM 34.

The MFM 34 provides a voltage signal indicative of the direction and speed of the airflow through the MFM 34 to a controller 36. The voltage level of the signal from the MFM 34 is an indication of the direction of the airflow through the MFM 34, and thus, an indication of whether the compressor 16 is under surge. Therefore, the controller 36 can provide a signal to the motor 18 to speed up the compressor 16 to provide additional positive pressure to the FCM 14 to eliminate the surge condition if detected. Additionally, the controller 36 can provide a signal to open the back pressure valve 24 and reduce the pressure within the FCM 14 to also-remove the surge condition. Also, the controller 36 can open a by-pass valve 38 in the exhaust line 26 so that the pressure at the output of the compressor 16 is reduced to eliminate the surge condition.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
   a fuel cell module including a cathode input responsive to a charge airflow and a cathode exhaust;
   a compressor generating the airflow applied to the cathode input of the fuel cell module;
   a surge detection device receiving the airflow sent to the compressor, said surge detection device being operable to determine and measure the airflow through the surge detection device in a forward direction and a reverse direction, said surge detection device generating a signal indicative of the direction of the airflow through the compressor; and
   a controller responsive to the signal from the surge detection device, said controller preventing compressor surge.

2. The system according to claim 1 wherein the compressor is a turbomachine compressor.

3. The system according to claim 2 wherein the compressor is selected from the group consisting of centrifugal, radial, axial and mixed flow compressors.

4. The system according to claim 1 wherein the surge detection device is a bi-directional mass flow meter.

5. The system according to claim 1 wherein the surge detection device is positioned upstream from the compressor, and receives the airflow before the compressor.

6. The system according to claim 1 further comprising a motor that drives the compressor, said controller providing a signal to the motor to control the speed of the compressor in response to the compressor surge.

7. The system according to claim 1 further comprising a back pressure valve positioned in the cathode exhaust, said back pressure valve controlling the pressure in the fuel cell module, said controller controlling the back pressure valve in response to the compressor surge.

8. The system according to claim 1 further comprising a by-pass valve in the cathode exhaust, said controller controlling the by-pass valve in response to the compressor surge.

9. The system according to claim 1 wherein the fuel cell system is on a vehicle.

10. A fuel cell system comprising:
    a fuel cell module including a cathode input responsive to a charge airflow and a cathode exhaust;
    a turbomachine compressor generating the charge airflow applied to the cathode input of the fuel cell module;
    a bi-directional mass flow meter responsive to the airflow prior to the airflow being applied to the compressor, said mass flow meter generating a signal indicative of the direction of the airflow through the compressor; and
    a controller responsive to the signal from the mass flow meter, said controller controlling the speed of the compressor so as to prevent a reverse flow of air through the compressor.

11. The system according to claim 10 wherein the compressor is selected from the group consisting of centrifugal, radial, axial and mixed flow compressors.

12. The system according to claim 10 further comprising a back pressure valve positioned in the cathode exhaust, said back pressure valve controlling the pressure in the fuel cell module, said controller controlling the back pressure valve in response to the reverse flow of air through the compressor.

13. The system according to claim 10 further comprising a by-pass valve positioned in the cathode exhaust, said controller opening the by-pass valve in response to the reverse flow of air through the compressor.

14. The system according to claim 10 wherein the fuel cell system is on a vehicle.

* * * * *